(12) United States Patent  
Alexander et al.

(10) Patent No.: US 7,142,968 B2
(45) Date of Patent: Nov. 28, 2006

(54) HITCH RAISE RATE CALIBRATION METHOD

(75) Inventors: William Guy Alexander, Waterloo, IA (US); Thomas Eugene Boe, Cedar Falls, IA (US); Derek Malcolm Eagles, Cedar Falls, IA (US); Jianming Yu, Cedar Rapids, IA (US)

(73) Assignee: Deere & Company, Moline, IL (US)

( * ) Notice: Subject to any disclaimer, the term of this patent is extended or adjusted under 35 U.S.C. 154(b) by 323 days.

(21) Appl. No.: 10/910,324

(22) Filed: Aug. 3, 2004

(65) Prior Publication Data

US 2006/0030989 A1 Feb. 9, 2006

(51) Int. Cl.
*A01B 63/112* (2006.01)
*G06F 19/00* (2006.01)

(52) U.S. Cl. ............... 701/50; 701/1; 701/36; 702/85; 172/8

(58) Field of Classification Search .............. 701/1, 701/36, 50; 702/85, 94; 172/2, 4, 7, 8, 439, 172/445
See application file for complete search history.

(56) References Cited

U.S. PATENT DOCUMENTS

| | | | |
|---|---|---|---|
| 4,931,967 A | 6/1990 | Boe et al. | 364/571.01 |
| 4,979,092 A * | 12/1990 | Bergene et al. | 700/28 |
| 5,012,415 A | 4/1991 | Boe et al. | 364/424.07 |
| 5,421,416 A | 6/1995 | Orbach et al. | 172/4 |
| 5,469,921 A | 11/1995 | Orbach et al. | 172/4 |
| 5,472,056 A * | 12/1995 | Orbach | 172/2 |
| 5,549,166 A | 8/1996 | Orbach et al. | 172/4 |
| 5,810,095 A | 9/1998 | Orbach et al. | 172/2 |
| 5,902,344 A * | 5/1999 | Eike et al. | 701/67 |
| 5,918,195 A * | 6/1999 | Halgrimson et al. | 702/94 |
| 6,016,875 A | 1/2000 | Orbach et al. | 172/2 |
| 6,209,656 B1 * | 4/2001 | Gengler et al. | 172/2 |
| 2004/0182619 A1 * | 9/2004 | McGregor et al. | 180/167 |

OTHER PUBLICATIONS

Deere & Company, "Hitch Control Unit (HCU) Factory Calibration 8000 & 9000 Series Tractors (Wheeled & Tracked)", 11 pages, Oct. 1, 2001.

* cited by examiner

*Primary Examiner*—Tan Q. Nguyen

(57) ABSTRACT

A method is provided for automatically determining a hitch raise rate calibration value for a hitch control system having a hydraulic actuator for moving the hitch, a valve for controlling flow of hydraulic fluid to the actuator and an electronic hitch control unit. The method includes applying a first control signal to the valve to cause the hitch to raise, determining a first hitch velocity as the hitch moves in response to the first control signal, and repeating these steps for a second control signal. The raise rate calibration value is then calculated as a function of a desired raise velocity, the first and second control signals and the first and second velocities.

6 Claims, 2 Drawing Sheets

HITCH RAISE RATE CALIBRATION METHOD

BACKGROUND

The present invention generally relates to an electro-hydraulic hitch control system for controlling a hitch mounted on an agricultural tractor, and more particularly, relates to a method of calibrating a control parameter of such a hitch control system.

Currently available hitch control systems have various parameters which must be determined or calibrated and stored in order for the hitch control system to function as desired.

For example, U.S. Pat. No. 5,012,415, issued to Boe et al., in 1991 describes a hitch control system raise rate calibration method which requires the operator to manipulate the hitch control lever and a drop rate potentiometer.

U.S. Pat. No. 4,931,967, issued to Boe et al., in 1990 describes a hitch control system having a calibration and configuration algorithm which operates to establish the sensor ranges of all sensors installed and disables certain configurable features if the associated sensors are not present.

U.S. Pat. No. 5,472,056, issued to Orbach in 1995 describes a hitch assembly and control system and calibration methods therefore. The calibration methods determine and store calibration parameters relating to lower hitch position, upper hitch position, hitch lower threshold and hitch raise threshold.

U.S. Pat. No. 5,918,195, issued to Halgrimson et al., in 1999, describes a system for calibrating a control system command device by moving the command device into predefined positions and storing sensed calibration values.

U.S. Pat. No. 5,810,095, issued to Orbach et al., in 1998, describes a hitch control system wherein valve control signal threshold values are modified in response to detection of undesired hitch movement.

But, none of the systems or methods described in these patents provides any system or method for determining hitch raise rate calibration parameters.

For prior production of John Deere tractor hitch control systems, the hitch raise rate calibration parameter was experimentally determined. In particular, a small group of sample tractors having different combinations of hitch cylinder sizes and raise valves was chosen. For each sample tractor, a range of different raise valve currents was tested to determine what raise valve current would cause the hitch to fully raise in 3 seconds. An average number was determined for groups of vehicles with the same cylinder size and raise valve. A lookup table of these numbers and the corresponding cylinder sizes and valves was stored in the hitch control units on the tractors. Then, during the manufacturing process of each tractor, a technician selected and entered into the hitch control unit data for the cylinder and valve for that particular tractor, and the hitch control unit then selected or enabled and used the corresponding valve raise rate current. However, it was time consuming to test multiple different experimental raise current values. Also, the experimentally determined average number may not produce the desired raise rate for a particular tractor. Also, the technician may enter incorrect data pertaining to cylinder size and valve.

If the raise rate calibration value is determined during field operation, inaccuracies may be caused by varying conditions and limitations on the number of changes allowed to the available nonvolatile memory hardware. For example, the system may set the calibration value artificially high due to low engine speed or other conditions. Then, when these conditions are adjusted or removed, the hitch will raise at an excessive rate for a moment with a rapid deceleration as the control system adjusts to these new conditions. Such changes in acceleration can cause excessive jerk that can cause customer dissatisfaction.

SUMMARY

Accordingly, an object of this invention is to provide a method for rapidly determining an accurate hitch raise rate calibration value.

A further object of the invention is to provide such a method which is reliable.

A further object of the invention is to provide such a method which is not subject to operator error.

These and other objects are achieved by the present invention, wherein a method is provided for automatically determining a hitch raise rate calibration value for a hitch control system having a hitch mounted on a vehicle, a hydraulic actuator for moving the hitch, a hitch position sensor, a valve for controlling flow of hydraulic fluid to the actuator and an electronic hitch control unit for supplying valve control signals to the valve. The method includes applying a first estimated control signal to the valve to cause the hitch to raise, determining a first hitch velocity as the hitch moves in response to the first control signal, applying a second estimated control signal to the valve, determining a second hitch velocity as the hitch moves in response to the second control signal, and calculating the raise rate calibration value as a function of a desired raise velocity, the first and second control signals and the first and second velocities. The hitch velocities are determined by storing a hitch start position obtained from the position sensor, after a certain delay time period T storing a hitch end position, and calculating the hitch velocity by dividing the change in position by the time period. The method includes waiting for a certain time period between applying the estimated control signal and storing the hitch start position.

The raise rate calibration value determined during this process is retained in nonvolatile memory in the hitch controller for use during normal hitch operations. Because raise valve flow rate is affected by variables such as hitch load, hydraulic oil temperature, engine speed, lift cylinder volumes and valve characteristics, this allows the control system to determine the raise rate calibration flow rate in a controlled environment where these variables are preset. In addition, the raise rate calibration value is determined automatically by the control unit, reducing the chances of operator error.

DETAILED DESCRIPTION

Figure 1:
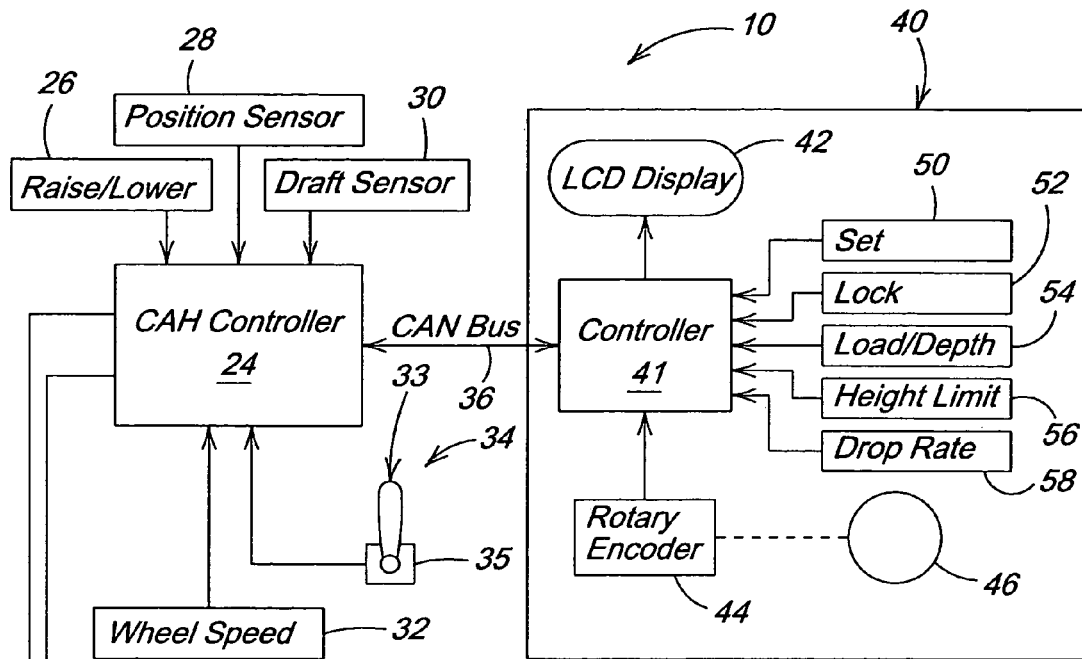
FIG. 1 is a schematic diagram of a hitch control system.
Figure 1:
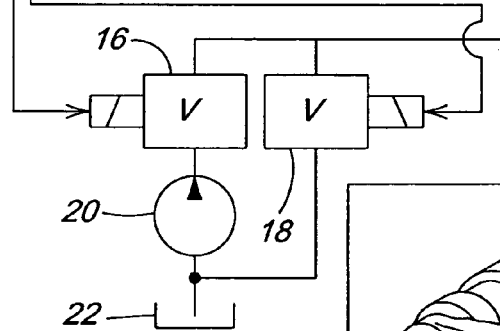
Figure 1:
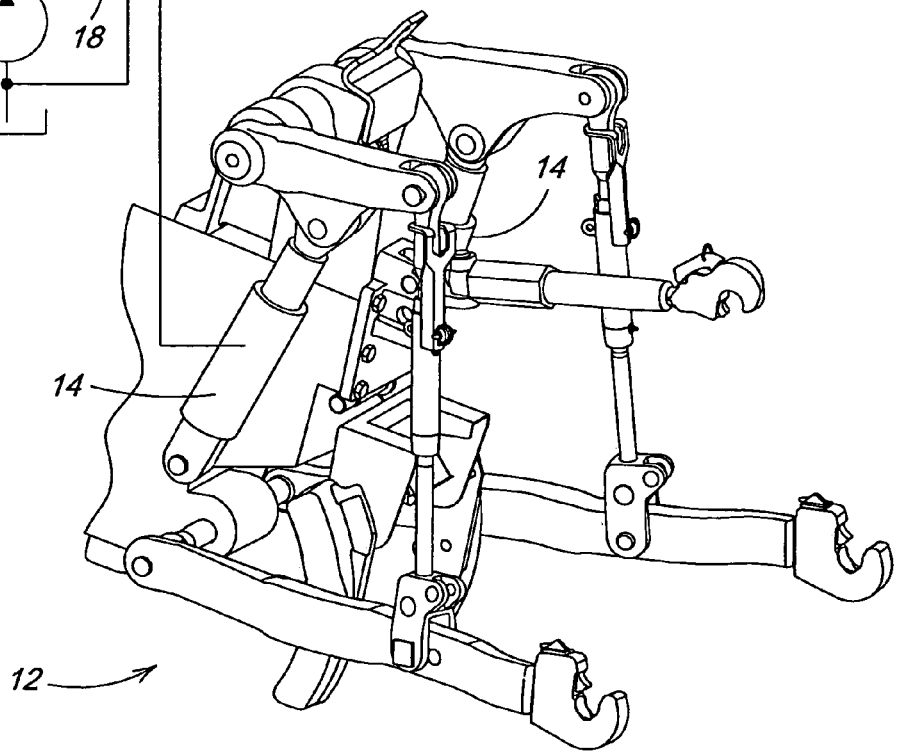

Referring to FIG. 1, a hitch system 10 includes a hitch 12, such as a conventional 3-point hitch, to which tools and implements (not shown) can be integrally attached, as distinguished from towed implements which are coupled to a tractor drawbar (not shown). The hitch 12 is raised and lowered by conventional hitch cylinders 14. Conventional electro-hydraulic raise and lower valves 16, 18 control communication between pump 20, reservoir 22 and cylinder 14. Valves 16 and 18 are controlled by valve command signals generated by a microprocessor-based electronic control unit 24 which includes conventional valve drivers (not shown). Control unit 24 receives signals from a conventional external raise/lower switch 26, and parameter signals including a hitch position signal from a conventional hitch position sensor 28, a draft force signal from a conventional draft force sensor 30, a vehicle or wheel speed signal from a conventional vehicle or wheel speed sensor 32. A hitch command lever unit 34 includes a lever 33 and a lever position sensor or transducer 35. The control unit 24 also receives the lever position signal from sensor 35.

A conventional CAN bus 36 communicates the control unit 24 with a display/control unit 40. Display/control unit 40 includes a controller 41, display 42, and a rotary encoder 44 which is controlled by a rotary control knob 46. Control unit 40 also includes a set switch 50, a lock switch 52, a load/depth switch 54, a height or raise limit switch 56 and a drop rate switch device 58. Control unit 24 transmits signals from sensors and control devices 26–n34 to control unit 40 via CAN bus 36. Display/control unit 40 receives signals from encoder 44 and switches 50–58 and transmits the signals to display 42 and control unit 24.

The switches 50–58 are preferably implemented as touch switches on the display/control panel 40 utilizing known touch switch technology. Such a touch switch control/display panel is known and has been commercially available on production equipment, such as John Deere Model 7020 tractors. As in this known control panel, the control knob 46 is preferably also mounted on the control panel 40.

A load/depth mix signal associated with load/depth mix select switch 54 can be set by actuating switch 54 and adjusting the associated value with the rotary control knob 46. The height limit signal associated with height limit select switch 56 can be set by actuating switch 56 and adjusting the associated value with the rotary control knob 46. A drop rate signal associated with drop rate select switch 58 can be set by actuating switch 58 and adjusting the associated value with the rotary control knob 46. Alternatively, load/depth, height limit and drop rate values could be set or adjusted using for each value a separate conventional rotary transducer coupled to control knob, such as used on production John Deere 7000 tractors.

The control unit 24, in response to the various inputs to it, generates the valve command signals according to an algorithm which is basically similar to the algorithm described in U.S. Pat. No. 4,979,092, which is incorporated by reference herein. For example, the control unit 24 generates, through a closed control loop, the valve command or hitch control signals as a function of signals representing the lever position, hitch position, draft force, wheel speed, load/depth mix, height limit and drop rate signals and as a function of various criteria. Most of these basic hitch control functions are known and have been available on commercially available tractors with non-spring centered command levers.

When a valve control signal is applied to raise valve 16, hydraulic fluid flows from pump 20 to cylinders 14, extending cylinders 14 and raising the hitch 12. The rate at which the hitch raises is a function of the rate of fluid flow from pump 20 and the volume of cylinders 14, and the rate of fluid flow is controlled by valve 16 and as a function of the signal applied to valve 16. It is necessary to determine and store (or calibrate) the particular valve control signal which will cause the hitch 12 to raise at a predetermined desired rate, the "raise rate".

Figure 2:
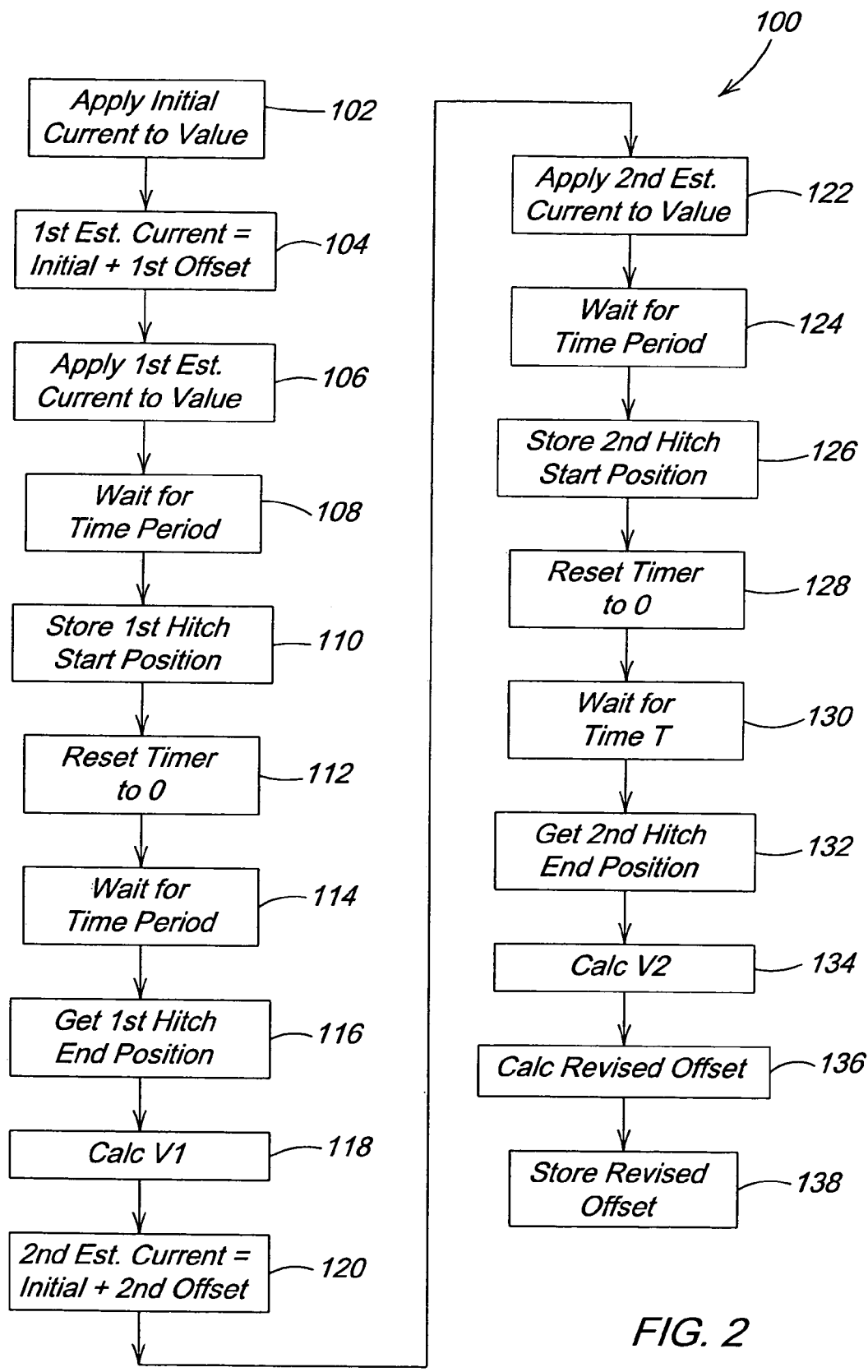
FIG. 2 shows a logic flow diagram illustrating an algorithm executed by the ECU of FIG. 1.

In the present invention, the control unit 24 automatically determines and stores this raise rate calibration value by performing the algorithm 100 illustrated by the logic flow chart FIG. 2. The conversion of the above flow chart into a standard language for implementing the algorithm described by the flow chart in a digital computer or microprocessor, will be evident to one with ordinary skill in the art.

Referring now to FIG. 2, in step 102 an initial current is applied to raise valve 16, where this initial current is the current which will cause valve 16 to begin to open and allow fluid to flow (typically called the dead band current).

Step 104 calculates a first new or estimated current which is equal to the initial current plus a current offset, so that the new current represents a first estimate of the current necessary to provide the desired hitch rate of movement. Step 106 applies the first estimated current to valve 16.

Step 108 causes the algorithm to wait until a timer (not shown) counts down for a time period T1, such as 0.10 seconds so that the hitch movement can reach a steady-state condition.

Step 110 stores a first hitch start position P1 obtained from position sensor 28.

Step 112 resets the timer.

Step 114 causes the algorithm to wait until the timer (not shown) counts down again for a time period T2, such as 0.50 seconds, so that the hitch will have time to move in response to opening of the raise valve 16.

Step 116 stores a first hitch end position P2 obtained from sensor 28.

Step 118 calculates a first hitch velocity $V1=(P2-P1)/T2$.

Step 120 calculates a second estimated current which is equal to the initial current plus a second current offset, so that the second estimated current represents a second estimate of the current necessary to provide the desired hitch rate of movement.

Step 122 applies the second estimated current to valve 16.

Step 124 causes the algorithm to wait until a timer (not shown) counts down for a time period T1, again so that the hitch movement can reach a steady state.

Step 126 stores a second hitch start position P1 obtained from position sensor 28.

Step 128 resets the timer.

Step 130 causes the algorithm to wait until the timer (not shown) counts down again for a time period T2, again so that the hitch 12 will have time to move in response to the opening change of raise valve 16.

Step 132 stores a 2nd hitch end position P2 obtained from sensor 28.

Step 134 calculates a 2nd hitch velocity $V2=(P2-P1)/T2$.

Step 136 calculates a revised current offset value according to the following equation.

$$REVOFFSET=[((Vdesired-V1)\times 2^{nd}\ CURRENT)/(V2-V1)]-[((Vdesired-V2)\times 1st\ CURRENT)/(V2-V1)]$$

This revised OFFSET current value is then stored as the raise rate calibration value. Thereafter, when the hitch 12 is commanded to raise, a current equal to the deadband current plus the REVOFFSET current is applied to raise valve 16 so the hitch 12 will be raised at the desired velocity or rate Vdesired.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a hitch control system having a hitch mounted on a vehicle, a hydraulic actuator for moving the hitch, a hitch position sensor, a valve for controlling flow of hydraulic fluid to the actuator and an electronic hitch control unit for supplying valve control signals to the valve, a method of determining a hitch raise rate calibration value, the method comprising:

applying a first estimated control signal S1 to the valve to cause the hitch to raise;

determining a first hitch velocity V1 as the hitch moves in response to the first control signal;

applying a second estimated control signal S2 to the valve;

determining a second hitch velocity V2 as the hitch moves in response to the second control signal; and calculating the raise rate calibration value as a function of the first and second estimated control signals, the first and second hitch velocities, and a desired hitch raise rate.

2. The method of claim 1, wherein:

the raise rate calibration value is calculated according to the following equation:

REVOFFSET=[((*V*desired−*V*1)×*S*2)/(*V*2−*V*1)]−
[((*V*desired−*V*2)×*S*1)/(*V*2−*V*1)], where Vdesired is the desired hitch raise rate.

3. The method of claim 1, further comprising determining the first hitch velocity V1 by:

storing a first hitch start position Ps1 obtained from the position sensor;

after a certain delay time period T storing a first hitch end position Pe1 obtained from the position sensor; and calculating a first hitch velocity V1=(Pe1−Ps1)/T.

4. The method of claim 3, further comprising
waiting for a certain time period between applying the first estimated control signal and storing the first hitch start position.

5. In a hitch control system having a hitch mounted on a vehicle, a hydraulic actuator for moving the hitch, a hitch position sensor, a valve for controlling flow of hydraulic fluid to the actuator and an electronic hitch control unit for supplying valve control signals to the valve, a method of determining a hitch raise rate calibration value, the method comprising:

applying a first estimated control signal S1 to the valve;

storing a first hitch start position Ps1 obtained from the position sensor;

after a certain delay time period T storing a first hitch end position Pe1 obtained from the position sensor 28;

calculating a first hitch velocity V1=(Pe1−Ps1)/T;

applying a second estimated control signal S2 to the valve;

storing a second hitch start position Ps2 obtained from the position sensor;

after a certain delay time period T storing a second hitch end position Pe2 obtained from the position sensor;

calculating a second hitch velocity V2=(Pe2−Pe2)/T; and calculating the raise rate calibration value according to the following equation.

REVOFFSET=[((*V*desired−*V*1)×*S*2)/(*V*2−*V*1)]−
[((*V*desired−*V*2)×*S*1)/(*V*2−*V*1)], where Vdesired is a desired hitch raise rate.

6. The method of claim 5, further comprising:

waiting for a certain time period between applying the estimated control signal and storing the hitch start position.

* * * * *